United States Patent
Wu et al.

(10) Patent No.: US 12,105,810 B2
(45) Date of Patent: Oct. 1, 2024

(54) DATA POISONING METHOD AND DATA POISONING APPARATUS

(71) Applicant: National Tsing Hua University, Hsinchu (TW)

(72) Inventors: Shan-Hung Wu, Hsinchu (TW); Chia-Hung Yuan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 303 days.

(21) Appl. No.: 17/705,411

(22) Filed: Mar. 28, 2022

(65) Prior Publication Data

US 2023/0229789 A1 Jul. 20, 2023

(30) Foreign Application Priority Data

Jan. 17, 2022 (TW) .................................. 111101893

(51) Int. Cl.
  *G06F 21/60* (2013.01)
  *G06F 18/214* (2023.01)
  *G06N 20/10* (2019.01)

(52) U.S. Cl.
  CPC .......... *G06F 21/60* (2013.01); *G06F 18/2148* (2023.01); *G06N 20/10* (2019.01)

(58) Field of Classification Search
  CPC .. G06F 18/214; G06F 18/2148; G06F 18/217; G06F 18/28; G06F 18/22; G06F 21/60; G06F 21/566; G06F 21/6245; G06F 21/82; G06N 3/044; G06N 3/045; G06N 3/08; G06N 3/084; G06N 3/04; G06N 7/01; G06N 20/00; G06N 20/10; G06V 10/772;

(Continued)

(56) References Cited

U.S. PATENT DOCUMENTS

| | | | | |
|---|---|---|---|---|
| 2019/0325163 | A1* | 10/2019 | Sharad | G06F 21/82 |
| 2020/0184036 | A1* | 6/2020 | Wu | G06F 21/60 |
| 2020/0242466 | A1 | 7/2020 | Mohassel et al. | |

(Continued)

FOREIGN PATENT DOCUMENTS

| | | |
|---|---|---|
| CN | 111291901 | 8/2020 |
| CN | 112182576 | 1/2021 |
| CN | 112487479 | 3/2021 |

OTHER PUBLICATIONS

Chia-Hung Yuan and Shan-Hung Wu, "Neural Tangent Generalization Attacks," Proceedings of the 38th International Conference on Machine Learning, Jul. 2021, pp. 1-30.

*Primary Examiner* — Le H Luu
(74) *Attorney, Agent, or Firm* — JCIPRNET (57) ABSTRACT

A data poisoning method and a data poisoning apparatus are provided. In the method, a training dataset and a validation dataset are retrieved. A perturbation is randomly initiated and added to data in the training dataset to generate poisoned training data. Values of multiple kernel functions of the poisoned training data and the validation dataset are computed by using kernel functions in a Gaussian process, and used to compute a mean of the Gaussian process on the validation dataset. A loss between the mean and the data in the validation dataset is computed by using a loss function of the Gaussian process, and used to generate an objective function that maximizes the loss. The objective function is solved to compute the perturbation that can maximize the loss.

12 Claims, 6 Drawing Sheets

(58) Field of Classification Search
CPC ... G06V 10/774; G06V 10/776; G06V 10/751
See application file for complete search history.

(56) References Cited

U.S. PATENT DOCUMENTS

| | | | |
|---|---|---|---|
| 2020/0327252 A1 | 10/2020 | McFall et al. | |
| 2020/0410098 A1* | 12/2020 | Kolouri | G06N 3/04 |
| 2020/0410335 A1* | 12/2020 | Gu | G06V 10/776 |
| 2021/0141926 A1 | 5/2021 | Ferrer et al. | |
| 2021/0256125 A1* | 8/2021 | Miller | G06F 21/566 |
| 2021/0303695 A1* | 9/2021 | Grosse | G06N 3/08 |
| 2022/0027674 A1* | 1/2022 | Malaya | G06N 3/084 |
| 2022/0053005 A1* | 2/2022 | Liu | G06F 18/22 |
| 2022/0292185 A1* | 9/2022 | Andreina | G06V 10/751 |
| 2023/0088588 A1* | 3/2023 | Habiba | G06F 21/6245 |
| | | | 713/189 |

* cited by examiner

Algorithm 1 Neural Tangent Generalization Attack

Input: $\mathbb{D} = (\boldsymbol{X}^n, \boldsymbol{Y}^n), \mathbb{V} = (\boldsymbol{X}^m, \boldsymbol{Y}^m), \bar{f}(\cdot; k(\cdot, \cdot), t),$
$L, r, \eta, \mathcal{T}(\epsilon)$

Output: $\boldsymbol{P}$ to be added to $\boldsymbol{X}^n$

1 Initialize $\boldsymbol{P} \in \mathcal{T}(\epsilon)$
2 for $i \leftarrow 1$ to $r$ do
3 $\quad \boldsymbol{G} \leftarrow \nabla_{\boldsymbol{P}} L(\bar{f}(\boldsymbol{X}^m; \hat{\boldsymbol{K}}^{m,n}, \hat{\boldsymbol{K}}^{n,n}, \boldsymbol{Y}^n, t), \boldsymbol{Y}^m)$
4 $\quad \boldsymbol{P} \leftarrow \text{Project}(\boldsymbol{P} + \eta \cdot \text{sign}(\boldsymbol{G}); \mathcal{T}(\epsilon))$
5 end
6 return $\boldsymbol{P}$

DATA POISONING METHOD AND DATA POISONING APPARATUS

CROSS-REFERENCE TO RELATED APPLICATION

This application claims the priority benefit of Taiwan application serial no. 111101893, filed on Jan. 17, 2022. The entirety of the above-mentioned patent application is hereby incorporated by reference herein and made a part of this specification.

BACKGROUND

Technical Field

The disclosure relates to a data processing method and apparatus, and more particularly, to a data poisoning method and apparatus.

Description of Related Art

Machine learning models have achieved impressive performance in many applications, including computer vision, natural language processing, etc. Training a machine learning model usually requires a large dataset to reach better performance. This encourages many practitioners to scrape data from external sources such as the Internet.

However, an external data owner may not be willing to let this happen. For example, many online healthcare or music streaming services own privacy-sensitive and/or copyright-protected data. They may not want their data being used to train a massive surveillance model or music generator that are violates their policies or business interests. With growing concerns about data privacy and security, additional data protection is necessary to prevent machine learning models from learning on given data.

SUMMARY

The disclosure provides a data poisoning method and a data poisoning apparatus that slightly modifies training dataset in order to spoil the training process such that a trained model lacks generalizability, thereby protecting data from unexpected use.

The disclosure provides a data poisoning method for an electronic apparatus having a processor. The method includes following steps: a training dataset and a validation dataset are retrieved; a perturbation is randomly initialized and the perturbation is added to data in the training dataset to generate poisoned training data; values of multiple kernel functions of the poisoned training data and the validation dataset are computed by using kernel functions in a Gaussian process and used to compute a mean of the Gaussian process on the validation dataset; a loss between the mean and the data in the validation dataset is computed by using a loss function in the Gaussian process and used to generate an objective function that maximizes the loss; and the perturbation that maximizes the loss is computed by solving the objective function.

The disclosure provides a data poisoning apparatus, which includes a data retrieving apparatus, a storage apparatus, and a processor. The storage apparatus is configured to store a computer program. The processor is coupled to the data retrieving apparatus and the storage apparatus and configured to load and execute the computer program so as to: receive a given training dataset and a validation dataset by using the data retrieving apparatus; randomly initialize a perturbation and add the perturbation to data in the training dataset to generate poisoned training data; compute values of multiple kernel functions of the poisoned training data and the validation dataset by using kernel functions in a Gaussian process and use thereof to compute a mean of the Gaussian process on the validation dataset; compute a loss between the mean and the data in the validation dataset by using a loss function in the Gaussian process and use thereof to generate an objective function that maximizes the loss; and solve the objective function to compute the perturbation that maximizes the loss.

Based on the above, the data poisoning method and the data poisoning apparatus of the disclosure spoil the training process of machine learning by modifying the training dataset, such that the machine learning model trained on the dataset lacks generalizability, thereby protecting the training data. Data owners can protect their data from unexpected use through the method of the disclosure.

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Wherever possible, the same reference numbers are used in the drawings and the description to refer to the same or like parts.

The attacks against machine learning models can happen at either training or test time, which are referred to as poisoning attacks and adversarial attacks, respectively. The goal of an adversarial attack is to mislead a trained model into making a wrong prediction given an adversarially crafted input. In contract, a poisoning attack aims to disrupt or interfere a training procedure to output defective models given an adversarially perturbed (or "poisoned") dataset.

Figure 1:
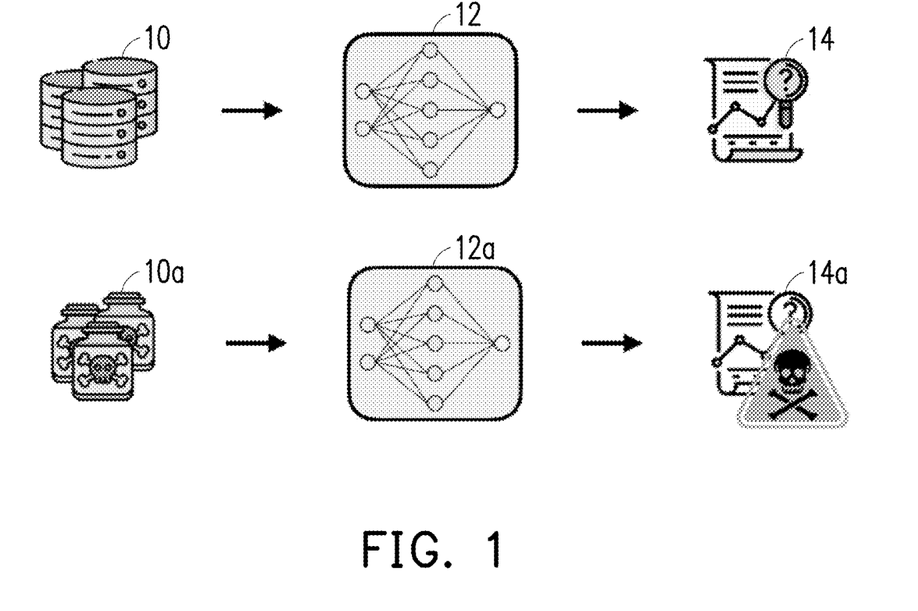
FIG. 1 is a comparative example of a machine learning model training process with normal and poisoned dataset according to an embodiment of the disclosure.

FIG. 1 is a comparative example of a machine learning model training with normal and poisoned dataset according to an embodiment of the disclosure. Referring to FIG. 1, if a machine learning model 12 is trained using a normal dataset 10, the machine learning model 12 may make predictions on any input data and obtain a correct prediction result 14; if a machine learning model 12a is trained using a poisoned dataset 10a, the machine learning model 12a will obtain a wrong prediction result 14a when making predictions on any input data.

The poisoning attacks can be divided into two categories: integrity and generalization attacks. In the field of data security, integrity attacks and generalization attacks are referred to as poisoning integrity attacks and poisoning availability attacks, respectively. The goal of the integrity attack is to let the training procedure output a model whose behaviour can be manipulated at test time. A common example is the backdoor attacks, where the model makes wrong predictions when certain triggers (i.e. patterns) are present in the input. On the other hand, the generalization attack aims to obtain a model that performs poorly on the validation and test datasets.

Figure 2:
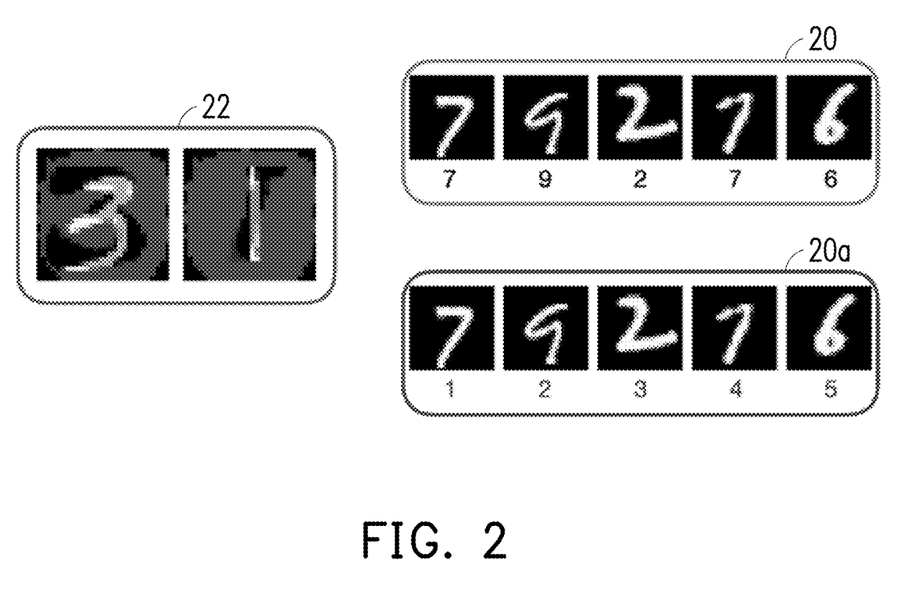
FIG. 2 is a schematic diagram of a generalization attack according to an embodiment of the disclosure.

For example, FIG. 2 is a schematic diagram of a generalization attack according to an embodiment of the disclosure. Referring to FIG. 2, in this embodiment, a human imperceptible perturbation is added to a test data 20 to generate poisoned data (e.g. poisoned data 22). If an unauthorized user trains the machine learning model by using this poisoned data, the machine learning model will obtain a wrong identification result when it later identifies the test data 20. As shown in FIG. 2, if the true numbers of the test data 20 are 7, 9, 2, 7, and 6, when the machine learning model identifies the test data 20 again after learning the poisoned data, it will obtain a wrong identification result 20a of numbers 1, 2, 3, 4, and 5. Thereby, the test data 20 can be prevented from being used by unauthorized persons.

Depending on whether an attack changes the labeling of training data, the poisoning attacks can also be divided into clean-label and dirty-label attacks. Normally, a dirty-label attack is easier to generate than a clean-label one because the loss function surface of the model is controlled by both the data points and labels. The embodiments of the disclosure focus on clean-label generalization attacks since they allow legitimate users to consume the dataset by following the owner's intention (and labelling) after data poisoning.

Accordingly, in the embodiments of the disclosure, generalization attack, a data poisoning technique, against the machine learning model, especially for deep neural networks (DNNs), is proposed, where an attacker aims to slightly modify training dataset in order to spoil the training process such that a trained model lacks generalizability. These attacks can be performed by data owners and protect data from unexpected use. Detailed steps of the data poisoning method according to the embodiments of the disclosure are described below with examples:

First, given a training dataset $\mathbb{D} = (X^n \in \mathbb{R}^{n \times d}, Y^n \in \mathbb{R}^{n \times c})$ of n examples with d dimensional input variables and n examples of c dimensional labels, a validation dataset $\mathbb{V} = (X^m, Y^m)$ of m examples, and a model $f(.; \theta)$ parametrized by $\theta$, the objective function of a generalization attack can be formulated as a bilevel optimization problem:

$$\arg\max_{(P,Q) \in \mathcal{T}} L(f(X^m; \theta), Y^m)$$

subject to:

$$\theta^* \in \arg\min_{\theta} L(f(X^n + P; \theta), Y^n + Q) \quad (1)$$

where P and Q are the perturbations to be added to $\mathbb{D}$, and $L(.,.)$ is a loss function between model predictions and ground-true labels, and $\mathcal{T}$ is a threat model that controls the allowable values of P and Q. The outer max problem finds P and Q that disrupt the generalizability of a model f on $\mathbb{V}$, while the inner min problem trains f on the poisoned training data $\tilde{\mathbb{D}} = (X^n + P, Y^n + Q)$. In practice, the loss functions for training and validation may be different. By controlling the treat model $\mathcal{T}$, different types of attack may be defined. For a clean-label attack, Q is required to be a zero matrix. In the case where an attacker only poisons partial training dataset, some rows of P are zero.

When solving Equation (1) by gradient descent, it is necessary to compute the gradients of $L(f(X^m; \theta), Y^m)$ with respect to P and Q through multiple training steps of f. If f is trained using gradient descent, the gradients of $L(f(X^m; \theta), Y^m)$ require the computation of high-order derivatives of an optimal weight $\theta^*$ and easily become intractable.

In the embodiments of the disclosure, a technique referred to as neural tangent generalization attack (NTGA) is proposed, which can effectively perform clean-label and black-box generalization attacks against deep neural networks. Through this data poisoning technique, data owners can protect their data from unauthorized use to train machine learning models.

A successful black-box generalization attack needs to overcome two key challenges: (i) to solve Equation (1) efficiently against a non-convex f; and (ii) to let f be a "representative" surrogate of the unknown target models used by third-party data consumers. The neural tangent generalization attack according to the embodiments of the disclosure can simultaneously cope with these two challenges, where f is taken as the mean of a Gaussian process that models the training dynamics of a class of indefinitely wide deep neural networks. Equation (1) is simplified using the fact that the predictions of f over unseen data at training time t can be written in a closed form without an exact $\theta^*$ involved. The following will demonstrate theoretically and experimentally that f could be a good surrogate of various unknown target models.

Figure 3:
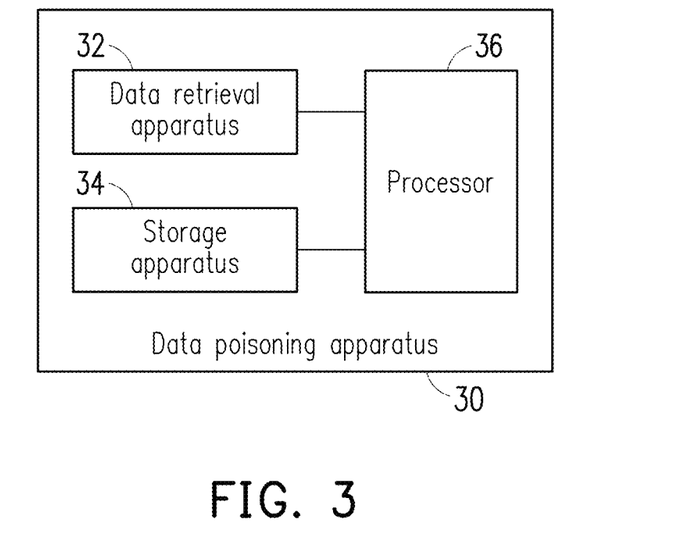
FIG. 3 is a block diagram of a data poisoning apparatus according to an embodiment of the disclosure.

FIG. 3 is a block diagram of a data poisoning apparatus according to an embodiment of the disclosure. Referring to FIG. 3, a data poisoning apparatus 30 according to the embodiments of the disclosure is, for example, a computer apparatus with computing capability such as a file server, a database server, an application server, a workstation, or a personal computer, and includes elements such as a data retrieving apparatus 32, a storage apparatus 34, and a processor 36, the functions thereof are described as follows.

The data retrieving apparatus 32 is, for example, a wired or wireless transmission interface such as universal serial bus (USB), RS232, bluetooth (BT), and wireless fidelity (Wi-Fi) configured to receive data provided by an external apparatus and output processed data. In one embodiment, the data retrieving apparatus 32 may also include a network card supporting Ethernet or wireless networking standards such as 802.11g, 802.11n, and 802.11ac, such that the data poisoning apparatus 30 may be connected to the database or server on the web and retrieve data through the web.

The storage apparatus 34 is, for example, any type of fixed or removable random access memory (RAM), read-only memory (ROM), flash memory, hard drive, similar element or a combination of the above, respectively configured to store computer programs executable by the processor 36.

The processor 36 is, for example, a central processing unit (CPU), or other programmable general-purpose or special-purpose microprocessors, microcontrollers, digital signal processors (DSP), programmable controllers, application specific integrated circuits (ASIC), programmable logic apparatus (PLD), other similar apparatuses, or combinations of these apparatuses, but the embodiment is not limited hereto. In this embodiment, the processor 36 may load a computer program from the storage apparatus 34 to perform the data poisoning method according to the embodiments of the disclosure.

Figure 4:
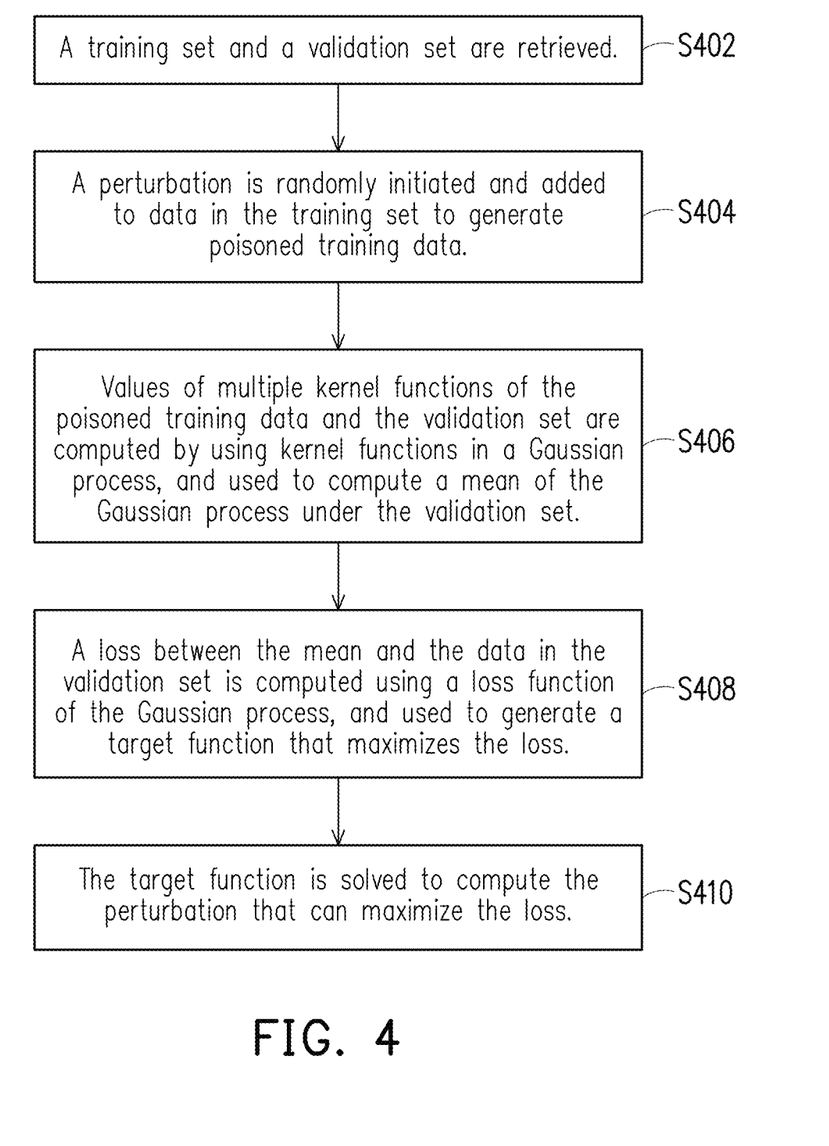
FIG. 4 is a flowchart of a data poisoning method according to an embodiment of the disclosure.

FIG. 4 is a flowchart of a data poisoning method according to an embodiment of the disclosure. Referring to FIGS. 3 and 4 at the same time, the method of this embodiment is applicable to the data poisoning apparatus 30 of FIG. 3. The following describes detailed steps of the data poisoning method of this embodiment using various elements of the data poisoning apparatus 30.

In step S402, the data poisoning apparatus 30 retrieves a training dataset and a validation dataset, for example, by the processor 36, where the data poisoning apparatus 30, for example, divides the data to be provided into a training dataset for training the learning model and a validation dataset for verifying the performance of the trained learning model. The materials described herein include, but are not limited to, one or more of a text, an image, an audio clip, a video, and categorical data.

In step S404, the processor 36 randomly initializes a perturbation, and adds the perturbation to the data in the training dataset to generate poisoned training data.

In step S406, the processor 36 computes values of multiple kernel functions of the poisoned training data and the validation dataset by using the kernel functions in a Gaussian process and uses thereof to compute a mean of the Gaussian process on the validation dataset, where the processor 36, for example, computes a first kernel function value between each data point in the poisoning training data and each data point in the validation dataset; computes a second kernel function value between every two data points in the poisoning training data; and computes the mean of the Gaussian process after multiple gradient descent updates by using the data of the validation dataset, the first kernel function value, the second kernel function value, and a label of the training dataset.

In detail, the distribution of a class of indefinitely wide neural networks (of any depth) can be nicely approximated by a Gaussian process before training or during training under gradient descent. In particular, the behaviour of the Gaussian process in the latter case is governed by a neural tangent kernel (NTK). As the width of the networks grows into infinity, the NTK converges to a deterministic kernel, denoted by $k(\cdot;\cdot)$, which remains constant during training. Given two data points $x^i$ and $x^j$, the $k(x^i; x^j)$ represents a similarity score between the two points from the network class' point of view. It only loosely depends on the exact weights of a particular network.

Here the mean of the Gaussian process is denoted by $\bar{f}$, and $K^{n \times n} \in \mathbb{R}^{n \times n \, n \times n}$ and $K^{m \times n} \in \mathbb{R}^{m \times n \, m \times n}$ are made to be two kernel matrices where $k_{i,j}^{n,n} = k(x^i \in \mathbb{D}; x^j \in \mathbb{D})$ and $k_{i,j}^{m,n} = k(x^i \in \mathbb{V}; x^j \in \mathbb{D})$, respectively. At time $t$ during the gradient descent training, in other words, after $t$ times of gradient descent updates, the mean prediction of the Gaussian process over the validation dataset $\mathbb{V}$ evolve as:

$$\bar{f}(X^m; K^{m,n}, K^{n,n}, Y^n, t) = K^{m,n}(K^{n,n})^{-1}(1 - e^{-\eta K^{n,n} t})Y^n \quad (2)$$

The above may be extended to approximate networks of a wide range of architectures, including convolutional neural networks (CNNs), recurrent neural networks (RNNs), neural networks with the attention mechanism, and other architectures. For a class of CNNs, the kernel of the approximating Gaussian process converges as the number of channels at each later grows into infinity.

Returning to the flow of FIG. 4, in step S408, the processor 36 computes a loss between the mean and the data in the validation dataset by using a loss function in the Gaussian process and uses thereof to generate an objective function that maximizes the loss.

In detail, by Equation (2), the predictions made by $\bar{f}$ over $\mathbb{V}$ can be written in a closed form without knowing the exact weights of a particular network, thus Equation (1) can be rewritten as a more straightforward problem:

$$\underset{P \in \mathcal{J}}{\mathrm{argmin}} L(\bar{f}(X^m; \hat{K}^{m,n}, \hat{K}^{n,n}, Y^n, t), Y^m) \quad (3)$$

where $\hat{K}^{n,n}$ and $\hat{K}^{m,n}$ are kernel matrices built on the poisoned training dataset such that $\hat{K}_{i,j}^{n,n} = k(X_{i,:}^n + P_{i,:}; X_{j,:}^n + P_{j,:})$ and $\hat{K}_{i,j}^{m,n} = k(X_{i,:}^m; X_{j,:}^n + P_{j,:})$, respectively. Here Q is made to be a zero matrix to focus on the clean-label generalization attacks. According to Equation (3), the gradient of a loss function L with respect to P may be easily computed without backpropagating through the training steps.

In step S410, the processor 36 solves the objective function (i.e. Equation (3)) to compute the perturbation that maximizes the loss. The computed perturbations may be added to the data in the training dataset to provide protection for the training dataset from being used by unauthorized users to train the machine learning model.

In one embodiment, the processor 36 may solve Equation (3) by projected gradient ascent. In detail, the processor 36 may compute a gradient of the loss between the mean and the data in the validation dataset with respect to the perturbation by projected gradient ascent, and iteratively update the perturbation added to the training dataset according to a value of the computed gradient, where the processor 36 includes, but is not limited to, the use of projected gradient ascent and other optimization methods, which, for example, increase or decrease the perturbation by a predetermined amount of variation according to a positive or negative value of the computed gradient, and, in response to a value of the updated perturbation exceeding a maximum allowable amount, project the perturbation back onto a boundary value of the maximum allowable amount.

Figure 5:
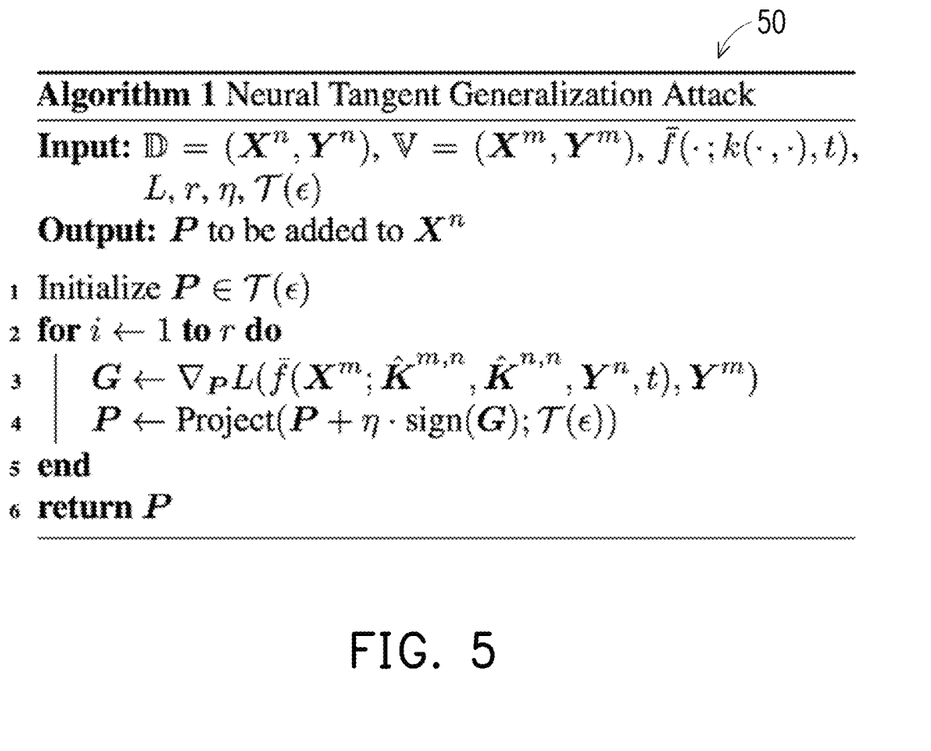
FIG. 5 is an algorithm flow of a neural tangent generalization attack according to an embodiment of the disclosure.

For example, FIG. 5 is an algorithm flow of a neural tangent generalization attack according to an embodiment of the disclosure. Referring to FIG. 5, an algorithm 50 outlines the key steps of a neural tangent generalization attack. At lines 2-5, it iteratively updates P added to the training dataset by projected gradient ascent. A hyperparameter r, which controls a maximum number of iterations, affects attack strength and running time. At line 4, neural tangent generalization attack projects the updated perturbations P onto a feasible set $\mathcal{T}(\epsilon)$ if they exceed the maximum allowable amount indicated by $\epsilon$. A smaller $\epsilon$ results in smaller perturbation makes an attack less visible to humans. The hyperparameter r controls when an attack (i.e. a returning P) will take effect during the training run by others. Since deep neural networks are usually trained with early stopping, the t should be a small number such as 8 or 64.

Neural tangent generalization attack (the algorithm 50) is compatible with any kernels, including, but not limited to, neural tangent kernel (NTK), convolutional neural tangent kernel (CNTK), recurrent neural tangent kernel (RNTK), neural network Gaussian process kernel, radial basis function kernel (RBF kernel), polynomial kernel, or string kernel. Considering the diversity of kernel functions, the embodiments of the disclosure are not limited to some specific types of kernel functions, but concentrate on the use of neural tangent generalization attack (algorithm 50) to poison the dataset to defend against unauthorized machine learning.

The neural tangent generalization attack is agnostic to the target models and training procedures used by third-party data consumers because the $\bar{f}$ in Equation (3) are just their surrogate. The reasons why the data poisoning method according to the embodiments of the disclosure can generate a successful black-box attack are two-folds. First, the Gaussian process behind $\bar{f}$ approximates the evolution of not only a single randomly initialized network by an ensemble of infinite random networks of the same architecture. This allows the neural tangent generalization attack to create a successful attack without knowing the exact weights of the target models. Second, the Gaussian process approximates the evolution of an ensemble of infinitely wide networks, which are known to be able to approximate any function universally. Also, a wider neural network tends to have a smoother loss with respect to $\hat{\mathbb{D}}$. This leads to a smoother surrogate and helps the neural tangent generalization attack find a better local optimum (via gradient ascent) that transfers. A smoother surrogate can lead to better attack transferability.

Figure 6A:
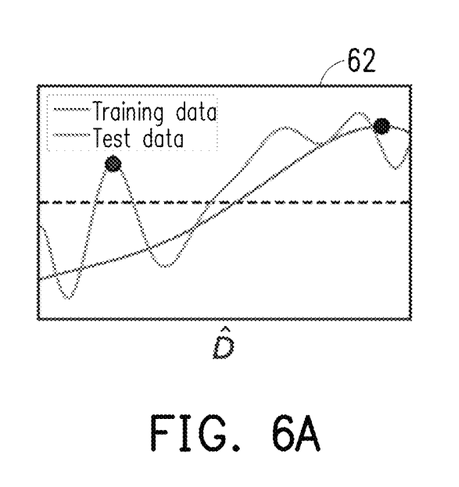
FIGS. 6A and 6B are comparative examples of loss function surfaces according to an embodiment of the disclosure.
Figure 6B:
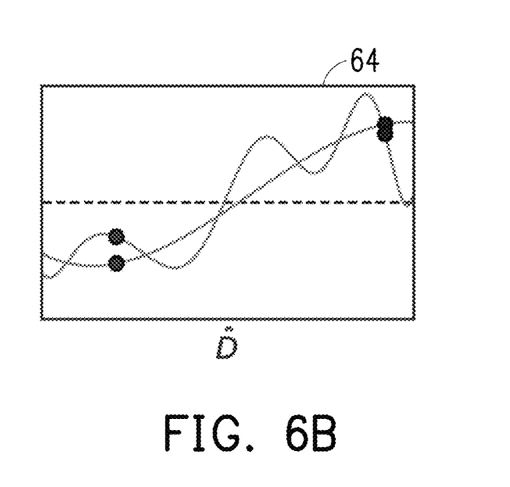

For example, FIGS. 6A and 6B are comparative examples of loss landscapes according to an embodiment of the disclosure. Graph 62 of FIG. 6A is a schematic diagram of the loss landscape over the space of the training dataset $\hat{\mathbb{D}}$, and graph 64 of FIG. 6B is a schematic diagram of the loss landscape of two deep neural networks trained by different third-parties. The horizontal axis indicates the training dataset, the vertical axis indicates the loss value, and the dash horizontal line indicates the threshold of a successful attack. Dots A and B in graph 62 indicate the poisoned training data crafted by the neural tangent generalization attack using the smooth and non-smooth surrogates, respectively. Dots C and D in graph 64 represent failure to attack the target models. To sum up, the neural tangent generalization attack can still generate a successful attack based on the above reasons when the model used by the third-party data consumers is unknown; that is to say, it does not need to tightly follow the architecture of a target model to create a successful attack, namely an effective generalization attack on an unknown model can be generated.

Another advantage of the neural tangent generalization attack is that it can generate collaborative perturbations that span across different training data points. In Equation (3), perturbations $P_{i,:}$ or individual training data point $X_{i,:}^n$ are solved collectively. So, each $P_{i,:}$ may slightly modify a point to remain invisible to human eyes, and together they can significantly manipulate model generalizability.

The computation of the gradients of the loss function L with respect to the perturbation P in Equation (3) back propagates through an inverse matrix $(\hat{K}^{n,n})^{-1}$ and a matrix index $$e^{-\eta K^{n,n_t}}$$

(see Equation (2)). This creates a scalability issue on the method when dealing with a large n.

In one embodiment, a modified version of the neural tangent generalization attack, called blockwise NTGA (B-NTG), that reduces the degree of collaboration is used. Specifically, the B-NTGA first partitions the training dataset $\mathbb{D}$ into multiple groups, where each group contains b examples, and then solves Equation (3) for each group independently. In effect, the perturbation P for the entire training dataset is solved using only the b×b diagonal blocks of an original matrix $\hat{K}^{n,n}$. Although missing the off-diagonal information, the B-NTA works if b is large enough to enable efficient collaboration. In practice, the perturbations for each block can be solved by multiple machines in parallel.

The neural tangent generalization attacks poison the training dataset by adding some human imperceptible perturbations to the data, which interfere with the raining process of the models and defect the trained models.

Figure 7A:
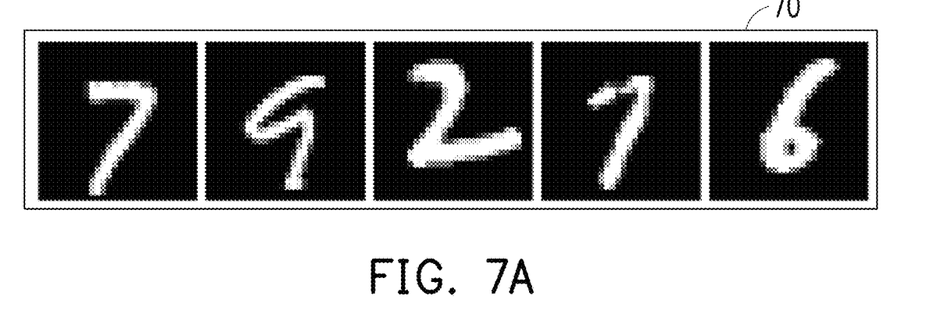
FIGS. 7A and 7B are examples of applying a neural tangent generalization attack to image data illustrated according to an embodiment of the disclosure.
Figure 7B:
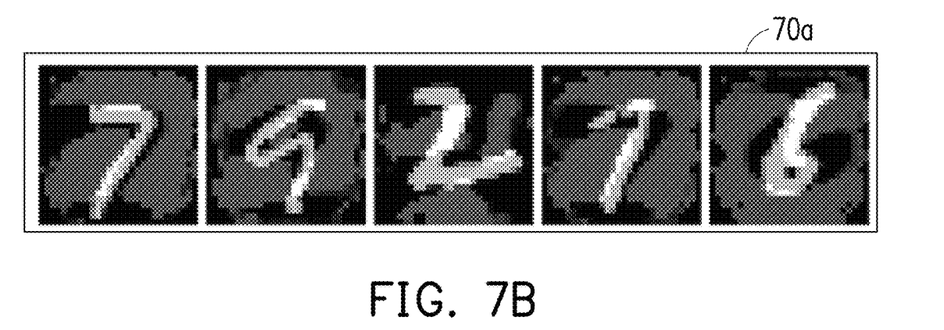
Figure 8A:
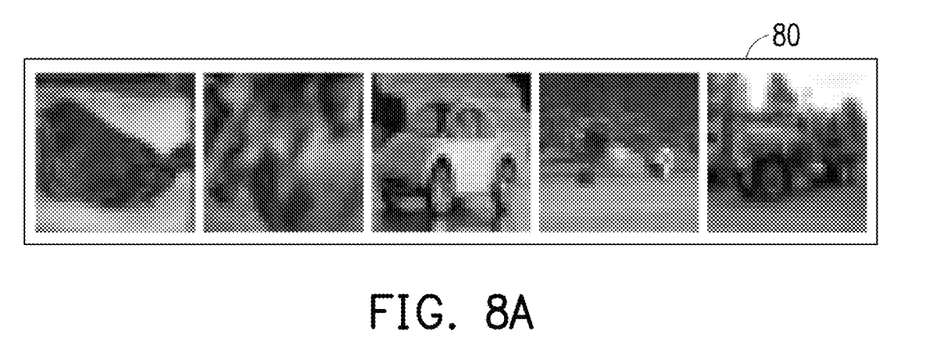
FIGS. 8A and 8B are examples of applying a neural tangent generalization attack to image data illustrated according to an embodiment of the disclosure.
Figure 8B:
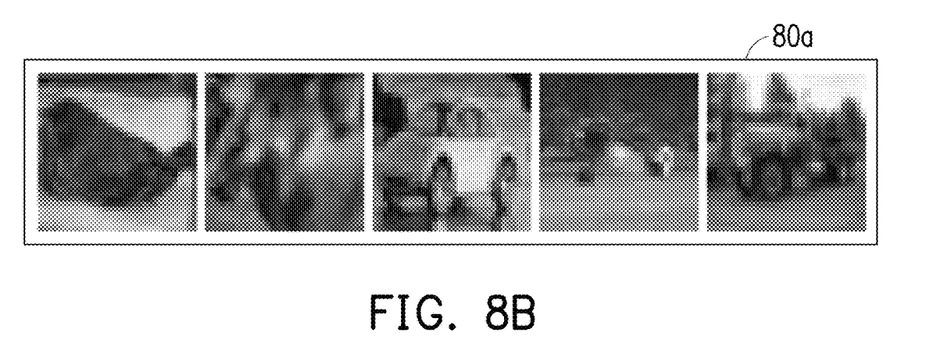

FIGS. 7A and 7B and FIGS. 8A and 8B are examples of example use cases of a neural tangent generalization attack on image data according to an embodiment of the disclosure. Each figure in a digital image 70 of FIG. 7A shows the original dataset, while each figure in a digital image 70a of FIG. 7B illustrates a poisoned (unlearnable) version of the figure in the digital image 70 crafted by the neural tangent generalization attack. Further, each figure in a color image 80 of FIG. 8A shows the original dataset, while each figure in a color image 80a of FIG. 8B illustrates a poisoned version of the figure in the color image 80 crafted by the neural tangent generalization attack. As shown in the figures, the unlearnable ones look almost the same as the original clean data. Nevertheless, the model trained on the unlearnable data lacks generalizability, which means that the effect on the validation or test data set will be greatly reduced.

Figure 9:
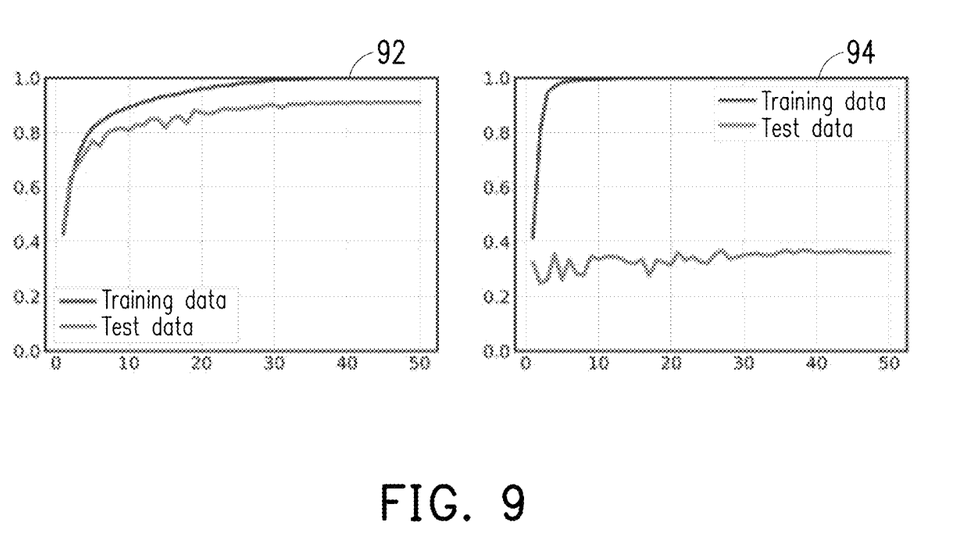
FIG. 9 is a comparison example of results of a DenseNet121 trained on a CIFAR-10 according to an embodiment of the disclosure.

If one uses the poisoned dataset modified by the neural tangent generalization attack, the training process may seem to succeed, however, the trained model will have no generalizability and always fail on the validation and test datasets unseen during the training process. FIG. 9 is a comparison example of results of a convolutional neural network DenseNet121 trained on a dataset CIFAR-10 according to an embodiment of the disclosure. Referring to FIG. 9, graph 92 demonstrates a normal learning curve, where the network is trained on the clean data, and the test accuracy rate achieves as high as 93%. On the contrary, graph 94 shows the remarkable result of the neural tangent generalization attack, where the training accuracy is close to 100%, but test accuracy drops sharply to about 37%; in other words, the model fails to generalize.

In addition to the above application to image data, the method according to the embodiments of the disclosure can also be applied to learning task of data classification, regression, object detection, image segmentation, generation, or the like, or other data involving personal privacy or intellectual property rights such as medical images and sound signals, but the disclosure is not limited thereto.

In summary, the data poisoning method and data poisoning apparatus according to the embodiments of the disclosure is capable of preventing unauthorized machine learning by performing neural tangent generalization attack on the data to be protected. Since the neural tangent generalization attacks decline the generalizability of the machine learning models significantly, the quality of the trained model is greatly reduced to be used in practice, forcing unauthorized practitioners, who scrape data from external sources such as the Internet, to discard the poisoned data, thereby protecting the data owner's data from unauthorized use.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A data poisoning method for an electronic apparatus having a processor, the method comprising following steps:
retrieving a training dataset and a validation dataset;
randomly initializing a perturbation and adding the perturbation to data in the training dataset to generate poisoned training data;
computing values of multiple kernel functions of the poisoning training data and the validation dataset by using kernel functions in a Gaussian process and using thereof to compute a mean of the Gaussian process on the validation dataset;
computing a loss between the mean and the data in the validation dataset by using a loss function in the Gaussian process and using thereof to generate an objective function that maximizes the loss; and
solving the objective function to compute the perturbation that maximizes the loss.

2. The method according to claim 1, wherein steps of computing the values of the multiple kernel functions of the poisoned training data and the validation dataset by using the kernel functions in a Gaussian process and using thereof to compute the mean of the Gaussian process on the validation dataset comprise:
computing a first kernel function value between each data point in the poisoning training data and each data point in the validation dataset;
computing a second kernel function value between every two data points in the poisoning training data; and
computing the mean of the Gaussian process after multiple gradient descent updates by using the data of the validation dataset, the first kernel function value, the second kernel function value, and a label of the training dataset.

3. The method according to claim 2, wherein steps of iteratively updating the perturbation added to the training dataset according to the value of the computed gradient comprise:
increasing or decreasing the perturbation by a predetermined amount of variation according to a positive or negative value of the computed gradient; and
in response to a value of the updated perturbation exceeding a maximum allowable amount, projecting the perturbation back onto a boundary value of the maximum allowable amount.

4. The method according to claim 1, wherein a step of solving the objective function to compute the perturbation that maximizes the loss comprises:
computing a gradient of the loss between the mean and the data in the validation dataset with respect to the perturbation by projected gradient ascent, and iteratively updating the perturbation added to the training dataset according to a value of the computed gradient.

5. The method according to claim 1, wherein after the step of computing the perturbation which maximizes the loss, the method further comprises:
adding the computed perturbation to the data in the training dataset.

6. The method according to claim 1, wherein the kernel function comprises a neural tangent kernel (NTK), a convolutional neural tangent kernel (CNTK), a recurrent neural tangent kernel (RNTK), a neural network Gaussian process kernel, a radial basis function kernel (RBF kernel), a polynomial kernel, or a string kernel.

7. A data poisoning apparatus, comprising:
a data retrieving apparatus;
a storage apparatus, storing a computer program; and
a processor, coupled to the data retrieving apparatus and the storage apparatus and configured to load and execute the computer program so as to:
receive a given training dataset and a validation dataset by using the retrieving apparatus;
randomly initialize a perturbation and add the perturbation to data in the training dataset to generate poisoned training data;
compute values of multiple kernel functions of the poisoning training data and the validation dataset by using kernel functions in a Gaussian process and use thereof to compute a mean of the Gaussian process on the validation dataset;
compute a loss between the mean and the data in the validation dataset by using a loss function in the Gaussian process and use thereof to generate an objective function that maximizes the loss; and
solve the objective function to compute the perturbation that maximizes the loss.

8. A data poisoning apparatus according to claim 7, wherein the processor computes a first kernel function value between each data point in the poisoning training data and each data point in the validation dataset; computes a second kernel function value between every two data points in the poisoning training data; and computes the mean of the Gaussian process after multiple gradient descent updates by using the data of the validation dataset, the first kernel function value, the second kernel function value, and a label of the training dataset.

9. The data poisoning apparatus according to claim 7, wherein the processor comprises computes a gradient of the loss between the mean and the data in the validation dataset with respect to the perturbation by projected gradient ascent, and iteratively updates the perturbation added to the training dataset according to a value of the computed gradient.

10. The data poisoning apparatus according to claim 9, wherein the processor increases or decreases the perturbation by a predetermined amount of variation according to a positive or negative value of the computed gradient; and, in response to a value of the updated perturbation exceeding a maximum allowable amount, projects the perturbation back onto a boundary value of the maximum allowable amount.

11. The data poisoning apparatus according to claim 7, wherein the processor further adds the computed perturbation to the data in the training dataset; and outputs the data in the training dataset with the perturbation added by using the data retrieving apparatus.

12. The data poisoning apparatus according to claim 7, wherein the kernel function comprises a neural tangent kernel, a convolutional neural tangent kernel, a recurrent neural tangent kernel, a neural network Gaussian process kernel, a radial basis function kernel, a polynomial kernel, or a string kernel.

* * * * *